May 1, 1945. G. A. RUBISSOW 2,374,956
MIRROR-SIGHT AIMING DEVICE
Filed Oct. 27, 1941
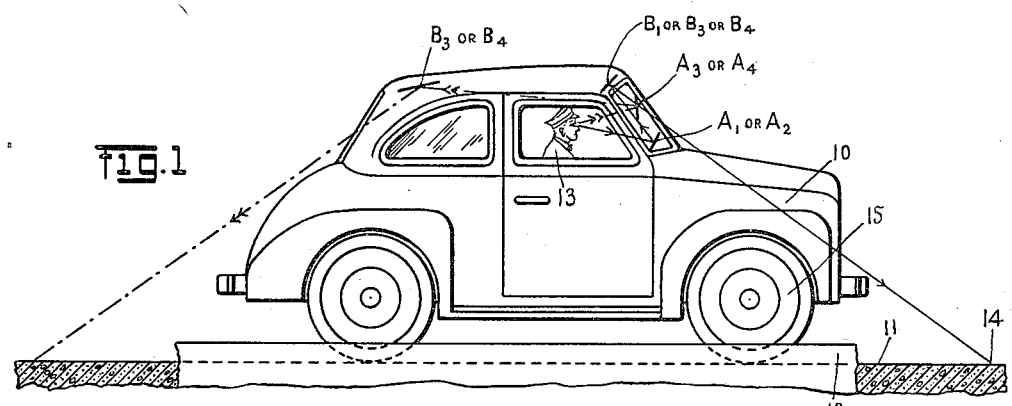
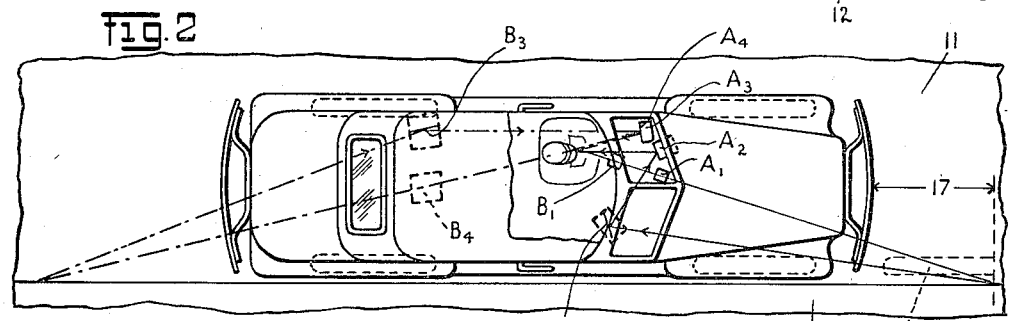
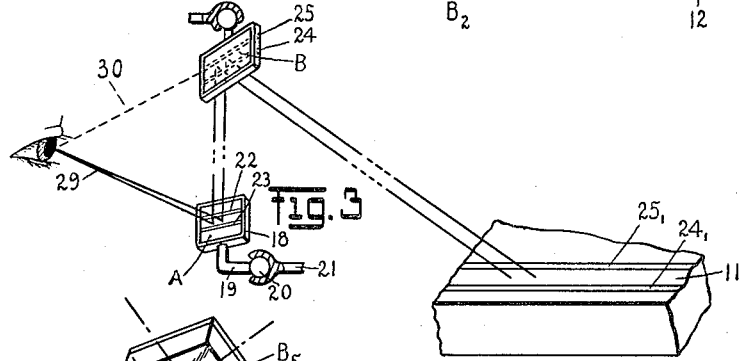
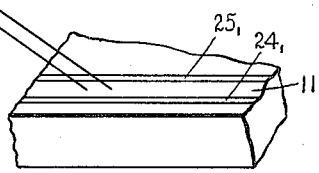
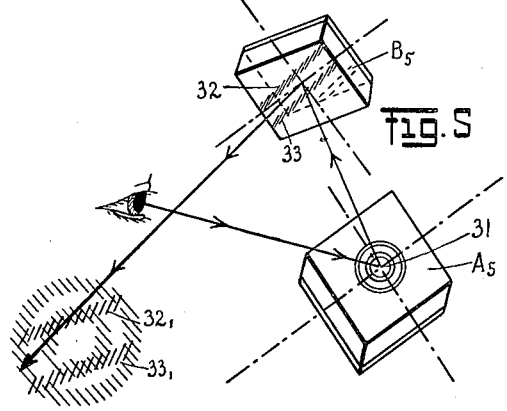
INVENTOR.
George A. Rubissow Patented May 1, 1945

2,374,956

UNITED STATES PATENT OFFICE 2,374,956

MIRROR-SIGHT AIMING DEVICE

George A. Rubissow, New York, N. Y.

Application October 27, 1941, Serial No. 416,737

6 Claims. (Cl. 88—2.2)

This invention provides simple means for a driver of a moving vehicle to register in advance the exact line of travel his vehicle will take.

For simplicity of description, the device will be described only in relation to automobiles, but it is also applicable to trains, trucks, bicycles, motorcycles, ships, motorships, speedboats, aeroplanes, trolley-cars, busses, and all other moving vehicles in especial military tanks, trucks and other military vehicles.

It is known that chauffeurs seeing ahead a stone or an obstacle of some kind lying close to the pathway of the wheels of the car, will attempt to guide the car so that the obstacle will be either to the left or the right of the wheels of the car, i. e., outside of the automobile course, or between the wheels. If the automobile is traveling at a considerable speed, the chauffeur usually cannot determine in advance exactly the course the wheels of his car will take, so for reasons of safety, very often swerves his car too far to either side in his attempt to avoid the obstacle, with sometimes loss of control and serious accidents in consequence.

Another case in point is that of two cars approaching each other on a very narrow road. The drivers very often will not know how close to the edge of the road they can go to avoid collision and will very often as a result touch the soft shoulder of the road or run onto the sidewalk, into a fence, etc., etc.

This device offers assurance to the driver that occurrences such as the two examples cited above can be met with equanimity and perfect safety.

In this specification, the sighting is directed on the road, but this invention is not limited thereto, as the sighting may be directed in the space in front of or behind the car, or to the sides of it, thus permitting heavy trucks or tanks to know in advance with what measure of safety they can pass through tunnels, bridge arcs, over mountain passes, etc. The same sighting may be used on ships, speed-boats, aeroplanes and the like for the same purposes.

The above and further objects and novel features will be more fully apparent from the following detailed description when the same is read in connection with the accompanying drawing. It is to be expressly understood, however, that the drawing is for purposes of illustration only and is not intended as a definition of the limits of the invention.

In the drawing wherein like reference characters refer to like parts throughout the several views, Figure 1 shows a top-plan view of an automobile provided with the device.

Figure 2 shows a side-view of Figure 1.

Figure 3 shows a schematical side-view partly in perspective of the device in operation.

Figure 4 shows the rearsight-mirror of the device.

Figure 5 shows a schematical side-view partly in perspective of another embodiment of the device.

Figures 1 and 2 show a sighting device consisting of at least two mirror-sights, a first mirror-sight $A_1$ and a second mirror-sight $B_1$ placed in a predetermined relationship and position one in respect to the other and to the eye of the driver 13, the vehicle 10, and the road 11, having sidewalks 12. When the driver 13 looks into the first mirror-sight $A_1$ the line of vision is reflected through the second mirror-sight $B_1$ enabling the driver to visualize a point 14 on the road 11. To control the position of this point 14 it is necessary that the first and second mirror-sights are provided with marks so that the projection of these marks on the road will determine at a predetermined distance, the exact pathway of the appropriate part of the car for which the herein described device is installed. For instance, for simplicity of description, the position 16 of the wheel 15 will be visualized at any desired predetermined distance 17 from the car, whereat the driver will be able to control in advance with absolute accuracy the exact course of the wheel of his car. The distance 17 is shown on the drawing as very close to the car but the distance is not limited to any spatial proximity or remoteness.

The front and rear mirror-sights may be so placed that their horizontal axes will be parallel. The marks may be straight lines of any combination thereof; they may be painted on either side of the mirrors or etched on their top surfaces, or they may be provided by scraping off the underside of the mirrors in apppropriate places.

The driver must place his eye in a predetermined position so that the marks provided on the front mirror-sight $A_1$ will register the marks on the rear mirror-sight $B_1$ and will enable him to visualize the projection of these marks on the road at a predetermined distance. The width and length of the inclinations of the markings on mirror-sights $A_1$ and $B_1$ one in respect to the other will afford a simultaneous observation of the whole road which will enable the driver to know exactly the course which his vehicle or the wheel of his vehicle will take at a predetermined given distance in advance. Instead of $A_1$ and $B_1$, A₂ and B₂ may be used, in which case the horizontal axes of these mirrors are not in the same plane, as shown on Figure 2.

Appropriate position of markings will permit the appropriate visualization of the pathway with simultaneous visualization of the markings for purposes herein described.

Another arrangement of mirrors A₃ and B₃ as shown on Figures 1 and 2 may be employed to similarly control the road behind the vehicle. Still another arrangement A₄ and B₄ may be employed.

Figure 3 shows diagrammatically the front mirror-sight A mounted in a frame 18 attached to a support 19 provided with adjustment means 20 and 21 attached to the vehicle. It is sufficient to provide the front mirror-sight A with one or more markings 22, 23, and to provide a rear mirror-sight B with at least one marking 24, 25, so that the eye when looking at the markings 22, or 22 and 23, will first register the markings 24 or 24 and 25, and thus see their projection 25₁, 24₁ on the road 11. For simplicity of design, the line of vision is shown passing through approximately the middle point of the markings. The inclination of the mirror A and B, the direction of the markings, their width and length are all exactly predetermined to provide a predetermined vision and projection of the same on the road at a predetermined distance.

On Figure 3, the markings on the mirror A are, by way of example, represented by straight lines painted or affixed on the top of the mirror. On the mirror B the markings are provided on the bottom surface of the mirror between the silvered surface and the glass.

On Figure 5, an arrangement of two mirrors A₅ and B₅ with a sight member 27 is shown schematically. The eye looking at the circular mark 31 registers the colored or etched-out marks 32 or 33 of the mirror B₅ and controls at any desired predetermined distance, the projection of markings 32₁, 33₁, shown schematically only. To assist the driver to register the marking 31 with the marking 32, or 33 and 32, an additional U-shaped sight-device 27 or a sight-device of another shape may be provided at a predetermined position between the eye of the driver and the mirror A₅.

The front or rear mirror sights as shown on Figure 4, may be mounted in a frame 18 and their direction controlled by vertical and horizontal position-controlling means 34 and 35.

If more than two mirror-sights are employed, they must be placed in appropriate positions, one in respect to the other.

This system of a combination of front and rear mirror-sights may also be employed on all types of guns or observation towers for exact aiming at the desired objective. It may thus substitute for the known peepsight, telescopic sight, etc., and has the advantage that the surroundings are seen in their entirety while aiming at the objective. For this particular purpose, the markings may be very thin and shaped accordingly. In certain cases, the cross-section of the markings may constitute the aiming-point, or where slots are used for the markings, the cross-section of the slots will determine the target.

The markings on the mirror-sights may also be made by means of transparent colors applied on either the mirror surface or on the glass of the mirror. These colors may, if desired, be very light, to permit the driver to see through them, and will present the appearance of the mirror being slightly colored in those particular places.

Other types of markings may be etched on the mirror-glass or scratched out on the mirror layer, or interposed between the mirror layer and the glass. They may also be pasted on or affixed to the surface of the mirror-glass, or close to the surface, or in the proximity thereof.

Having now particularly described and ascertained the nature of the said invention and the manner in which it is to be performed, I declare that what I claim is:

1. In a vehicle moving with respect to the ground, a direction aiming device mounted in said vehicle and comprising a first mirror-sight having a mark thereon, a second mirror-sight having at least one stripe, said mirror-sights being rigidly mounted at the predetermined distance one from the other in said vehicle, means to so adjust and thereafter maintain the angular position of said mirror-sights with respect to said vehicle that the simultaneous projection of said mark superimposed on said stripe will be seen on the said ground in a position substantially parallel to the direction of travel of said vehicle and at a predetermined distance therefrom, whereby the said projection of said stripe in combination with said mark enables the driver to continuously gauge the position of said vehicle with respect to said ground.

2. In a vehicle moving with respect to the ground, a direction aiming device mounted in said vehicle and comprising a first mirror-sight having at least one first stripe thereon, a second mirror-sight having at least two parallel stripes thereon, said mirror-sights being rigidly mounted at the predetermined distance one from the other in said vehicle, means to so adjust and thereafter maintain the angular position of said mirror-sights with respect to said vehicle that the simultaneous projection of said first stripe projected in-between said parallel stripes will be seen on the said ground in a position substantially parallel to the direction of travel of said vehicle and at a predetermined distance therefrom, whereby the said projection of said first stripe in between said two parallel stripes enables the driver to continuously gauge the position of said vehicle with respect to said ground.

3. In a vehicle moving with respect to the ground, a direction aiming device mounted in said vehicle and comprising a first mirror-sight having a mark thereon, a second mirror-sight having at least one stripe, said mark and said stripe being made from a substantially transparent material, said mirror-sights being rigidly mounted at the predetermined distance one from the other in said vehicle, means to so adjust and thereafter maintain the angular position of said mirror-sights with respect to said vehicle that the simultaneous projection of said mark superimposed on said stripe will be seen on the said ground in a position substantially parallel to the direction of travel of said vehicle and at a predetermined distance therefrom, whereby the said projection of said stripe in combination with said mark enables the driver to continuously gauge the position of said vehicle with respect to said ground.

4. In a vehicle moving with respect to the ground, a direction aiming device mounted in said vehicle and comprising a first mirror-sight having a mark thereon, a second mirror-sight having at least one stripe, said mark and said stripe being made from substantially transparent materials of different hues for the said mark and said stripe, said mirror-sights being rigidly mounted at the predetermined distance one from the other in said vehicle, means to so adjust and thereafter maintain the angular position of said mirror-sights with respect to said vehicle that the simultaneous projection of said mark superimposed on said stripe will be seen on the said ground in a position substantially parallel to the direction of travel of said vehicle and at a predetermined distance therefrom, whereby the said projection of said stripe in combination with said mark enables the driver to continuously gauge the position of said vehicle with respect to said ground.

5. In a vehicle moving with respect to the ground, a direction aiming device mounted in said vehicle and comprising a first mirror-sight having at least one first stripe thereon, a second mirror-sight having at least two parallel stripes thereon, said first stripe and said two parallel stripes being made from a substantially transparent material, said mirror-sights being rigidly mounted at the predetermined distance one from the other in said vehicle, means to so adjust and thereafter maintain the angular position of said mirror-sights with respect to said vehicle that the simultaneous projection of said first stripe projected in-between said parallel stripes will be seen on the ground in a position substantially parallel to the direction of travel of said vehicle and at a predetermined distance therefrom, whereby the said projection of said first stripe in between said two parallel stripes enables the driver to continuously gauge the position of said vehicle with respect to said ground.

6. In a vehicle moving with respect to the ground, a direction aiming device mounted in said vehicle and comprising a first mirror-sight having at least one first stripe thereon, a second mirror-sight having at least two parallel stripes thereon, said first stripe and said two parallel stripes being made from substantially transparent materials of different hues for the said first stripe and said two parallel stripes, said mirror-sights being rigidly mounted at the predetermined distance one from the other in said vehicle, means to so adjust and thereafter maintain the angular position of said mirror-sights with respect to said vehicle that the simultaneous projection of said first stripe projected in-between said parallel stripes will be seen on the ground in a position substantially parallel to the direction of travel of said vehicle and at a predetermined distance therefrom, whereby the said projection of said first stripe in between said two parallel stripes enables the driver to continuously gauge the position of said vehicle with respect to said ground.

GEORGE A. RUBISSOW.